(12) United States Patent
Koo et al.

(10) Patent No.: US 11,817,026 B2
(45) Date of Patent: Nov. 14, 2023

(54) SCREEN CONTROL APPARATUS OF A VEHICLE AND A METHOD THEREOF

(71) Applicants: HYUNDAI MOTOR COMPANY, Seoul (KR); KIA CORPORATION, Seoul (KR)

(72) Inventors: Hyun Woo Koo, Seoul (KR); Mun Jun Hur, Yongin-si (KR); Tae Ho Lee, Seoul (KR); Hyeo Jin Kim, Seoul (KR); Kwang Seung Heo, Seoul (KR); Kyowoong Choo, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 95 days.

(21) Appl. No.: 17/497,740

(22) Filed: Oct. 8, 2021

(65) Prior Publication Data
US 2022/0198978 A1 Jun. 23, 2022

(30) Foreign Application Priority Data

Dec. 21, 2020 (KR) .................. 10-2020-0180238

(51) Int. Cl.
*G09G 3/20* (2006.01)
*B60K 35/00* (2006.01)

(52) U.S. Cl.
CPC ............. *G09G 3/20* (2013.01); *B60K 35/00* (2013.01); *B60K 2370/349* (2019.05);
(Continued)

(58) Field of Classification Search
CPC ............. B60K 35/00; B60K 2370/152; B60K 2370/349; B60K 2370/52; B60W 40/105; B60W 50/14; B60W 2050/0022; B60W 2050/146; B60W 2520/10; G09G 3/035; G09G 3/20; G09G 3/32; G09G 3/3208;
(Continued)

(56) References Cited

U.S. PATENT DOCUMENTS

| 5,406,305 A | 4/1995 | Shimomura et al. |
| 5,554,912 A | 9/1996 | Thayer et al. |

(Continued)

FOREIGN PATENT DOCUMENTS

KR 20220098967 A 7/2022

OTHER PUBLICATIONS

Genesis Navigation Update Official Homepage, http://update.genesis.com/KR/KO/updateNoticeView/98; Jul. 22, 2020; 6pp.
(Continued)

*Primary Examiner* — Nelson M Rosario
(74) *Attorney, Agent, or Firm* — LEMPIA SUMMERFIELD KATZ LLC

(57) ABSTRACT

A screen control apparatus of a vehicle and a method thereof are provided. The screen control apparatus includes: a sensing device that measures illumination; a brightness determining device that determines a brightness degree corresponding to the illumination from one or more illumination measurement data; and a controller that controls a screen brightness of a display depending on the determined brightness degree. The controller controls the screen brightness of the display, whenever the brightness degree is changed.

19 Claims, 16 Drawing Sheets

(52) U.S. Cl.
CPC .. *B60K 2370/52* (2019.05); *G09G 2320/0233* (2013.01); *G09G 2320/0626* (2013.01); *G09G 2360/144* (2013.01); *G09G 2360/16* (2013.01); *G09G 2380/10* (2013.01)

(58) Field of Classification Search
CPC .... G09G 3/36; G09G 5/10; G09G 2320/0233; G09G 2320/0606; G09G 2320/0626; G09G 2360/144; G09G 2360/16; G09G 2380/10
See application file for complete search history.

(56) References Cited

U.S. PATENT DOCUMENTS

| | | | |
|---|---|---|---|
| 8,169,450 | B2 | 5/2012 | Santo et al. |
| 9,424,804 | B2 | 8/2016 | Jung et al. |
| 2006/0239017 | A1 | 10/2006 | Woo |
| 2006/0256067 | A1 | 11/2006 | Montero et al. |
| 2007/0055955 | A1 | 3/2007 | Lee et al. |
| 2008/0291139 | A1 | 11/2008 | Hsieh |
| 2009/0192704 | A1* | 7/2009 | Geelen ................... G01C 21/36 701/532 |
| 2012/0068981 | A1 | 3/2012 | Pantfoerder |
| 2014/0092119 | A1* | 4/2014 | Jung ........................ G09G 3/20 345/589 |
| 2015/0070337 | A1 | 3/2015 | Bell et al. |
| 2017/0116963 | A1 | 4/2017 | Wanat et al. |
| 2018/0053488 | A1 | 2/2018 | Hunter et al. |
| 2018/0190240 | A1 | 7/2018 | Ropo et al. |
| 2019/0304402 | A1* | 10/2019 | Suzuki ............... G02B 27/0101 |
| 2020/0164801 | A1 | 5/2020 | Takenaka et al. |
| 2021/0016793 | A1* | 1/2021 | Yamaguchi .......... G08G 1/0962 |
| 2022/0223119 | A1 | 7/2022 | Koo et al. |

OTHER PUBLICATIONS

Office Action cited in U.S. Appl. No. 17/521,555; dated Mar. 30, 2023; 17 pp.
Office Action cited in U.S. Appl. No. 17/521,555; dated Jul. 21, 2023; 6 pp.

* cited by examiner

| ROAD TYPE | NUMBER OF AVERAGE DATA |
|---|---|
| GENERAL ROAD | N(Default) |
| GENERAL ROAD + TUNNEL ENTRY | N-a |
| HIGHWAY | N-a |
| HIGHWAY + TUNNEL ENTRY | N-B |
| CENTER OF TOWN | N-a |
| FOREST | N-B |

FIG.4A

WHEN DRIVING AT SPEED
OF 15 KM/H

| Data1 | Data2 | Data3 | Data4 |
|---|---|---|---|
| Weght 1/45 | Weght 1/45 | Weght 1/45 | Weght 1/45 |

. . .

| Data42 | Data43 | Data44 | Data45 |
|---|---|---|---|
| Weght 1/45 | Weght 1/45 | Weght 1/45 | Weght 1/45 |

FIG.5A

WHEN DRIVING AT SPEED
OF 50 KM/H

| Data1 | Data2 | Data3 | Data4 |
|-------|-------|-------|-------|
| Weght 2/135 | Weght 2/135 | Weght 2/135 | Weght 2/135 |

. . .

| Data28 | ... | Data44 | Data45 |
|--------|-----|--------|--------|
| Weght 1/30 | ... | Weght 1/30 | Weght 1/30 |

FIG.5B

WHEN DRIVING AT SPEED
OF 100 KM/H

| Data1 | Data2 | Data3 | Data4 |
|---|---|---|---|
| Weght 1/180 | Weght 1/180 | Weght 1/180 | Weght 1/180 |

...

| Data37 | ... | Data44 | Data45 |
|---|---|---|---|
| Weght 4/45 | ... | Weght 4/45 | Weght 4/45 |

FIG.5C

WHEN DRIVING AT SPEED
OF 40 KM/H ON CENTER OF TOWN

| Data1 | Data2 | Data3 | Data4 |
|-------|-------|-------|-------|
| Weght 0.01 | Weght 0.01 | Weght 0.01 | Weght 0.01 |

• • •

| Data38 | ... | Data59 | Data60 |
|--------|-----|--------|--------|
| Weght 0.027 | ... | Weght 0.027 | Weght 0.027 |

FIG.6A

WHEN DRIVING AT SPEED
OF 77 KM/H ON FOREST

| Data1 | Data2 | Data3 | Data4 |
|---|---|---|---|
| Weght 0.003 | Weght 0.003 | Weght 0.003 | Weght 0.003 |

· · ·

| Data64 | · · · | Data74 | Data75 |
|---|---|---|---|
| Weght 0.07 | · · · | Weght 0.07 | Weght 0.07 |

FIG.6B

SCREEN CONTROL APPARATUS OF A VEHICLE AND A METHOD THEREOF

CROSS-REFERENCE TO RELATED APPLICATION

This application claims the benefit of priority to Korean Patent Application No. 10-2020-0180238, filed in the Korean Intellectual Property Office on Dec. 21, 2020, the entire contents of which are incorporated herein by reference.

TECHNICAL FIELD

The present disclosure relates to a screen control apparatus of a vehicle and a method thereof.

BACKGROUND

Recently, a vehicle has provided various pieces of information on a display in a vehicle, for example, an audio video navigation (AVN) or an infotainment system.

Thus, there has been an increase in the frequency where a user identifies information using the display.

The screen of the display outputs a fixed brightness on the basis of a previously set brightness value.

As such, a screen brightness of the display does not consider a change in external illumination environment at all.

Thus, although the periphery is dark or bright as the external environment is suddenly changed, because the screen brightness of the display is output as a fixed brightness, visibility of the user is degraded.

SUMMARY

The present disclosure has been made to solve the above-mentioned problems occurring in the prior art while advantages achieved by the prior art are maintained intact.

An aspect of the present disclosure provides a screen control apparatus of a vehicle for providing an optimized screen brightness of the display by using an illumination sensor and vehicle speed and position information in a vehicle environment having a rapid change in illumination to improve visibility of a user and a method thereof.

Another aspect of the present disclosure provides a screen control apparatus of a vehicle for applying a screen adjustment gain according to a user setting to a brightness table determining a brightness degree to improve satisfaction of a user and a method thereof.

The technical problems to be solved by the present disclosure are not limited to the aforementioned problems. Any other technical problems not mentioned herein should be clearly understood from the following description by those having ordinary skill in the art to which the present disclosure pertains.

According to an aspect of the present disclosure, a screen control apparatus of a vehicle may include: a sensing device that measures illumination; a brightness determining device that determines a brightness degree corresponding to the illumination from one or more illumination measurement data; and a controller that controls a screen brightness of a display depending on the determined brightness degree.

The controller may control the screen brightness of the display, whenever the brightness degree is changed.

The brightness determining device may determine the brightness degree using most recently received illumination measurement data, when the number of the illumination measurement data is less than a default.

The brightness determining device may calculate an average brightness on the basis of illumination measurement data corresponding to the number of average data, when the number of the illumination measurement data is greater than or equal to a default, and may determine the brightness degree based on the average brightness.

The brightness determining device may extract the illumination measurement data corresponding to the number of the average data in an order of being recently stored among previously stored illumination measurement data.

The brightness determining device may variably set the number of the average data depending on a position of the vehicle.

The brightness determining device may set the number of the average data to the default, when the position of the vehicle is a general road.

The brightness determining device may set the number of the average data to a value less than the default, when the position of the vehicle is a highway or when the vehicle enters a forward tunnel.

The brightness determining device may set the number of the average data to a value greater than the default, when the position of the vehicle is the center of town or a forest.

The screen control apparatus may further include a weight setting device that sets a weight to the illumination measurement data corresponding to the number of the average data depending on a vehicle speed.

The weight setting device may calculate the applied number of weights and a weight % based on a required time taken to move by a reference distance on the basis of a current vehicle speed.

The weight setting device may divide the weight % by the applied number of the weights and may respectively assign the divided weights to illumination measurement data corresponding to the applied number of the weights in an order of being recently stored.

The weight setting device may divide the other weight % except for the weight % and may respectively assign the divided weights to the other illumination measurement data except for the illumination measurement data to which the weights are assigned.

The weight setting device may assign an equal weight to the illumination measurement data corresponding to the number of the average data, when the applied number of the weights is greater than the number of the average data.

The brightness determining device may determine the brightness degree corresponding to the illumination from the illumination measurement data based on a brightness table defining a brightness change according to an illumination change.

The brightness determining device may correct the brightness table by applying a brightness adjustment gain of a user, when the screen brightness of the display is adjusted by the user.

According to an aspect of the present disclosure, a screen control method of a vehicle may include measuring illumination, determining a brightness degree corresponding to the illumination from one or more illumination measurement data, and controlling a screen brightness of a display depending on the determined brightness degree.

The controlling of the screen brightness may include controlling the screen brightness of the display, whenever the brightness degree is changed.

BRIEF DESCRIPTION OF THE DRAWINGS

The above and other objects, features, and advantages of the present disclosure should be more apparent from the following detailed description taken in conjunction with the accompanying drawings:

FIGS. 4A and 4B are drawings illustrating an embodiment of an operation of adjusting the number of average data according to an embodiment of the present disclosure;

FIGS. 5A, 5B, and 5C are drawings illustrating an embodiment of an operation of setting a weight of illumination measurement data according to an embodiment of the present disclosure;

FIGS. 6A and 6B are drawings illustrating an embodiment of an operation of setting a weight of illumination measurement data according to another embodiment of the present disclosure;

DETAILED DESCRIPTION

Figure 1:
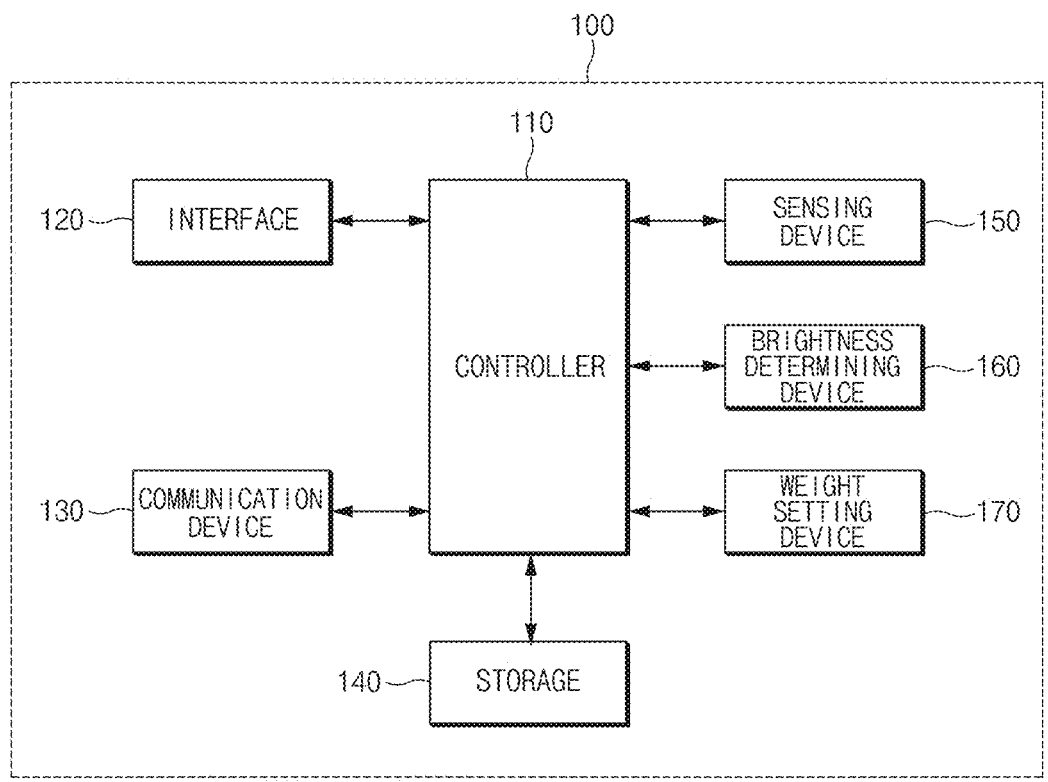
FIG. 1 is a block diagram illustrating a configuration of a screen control apparatus of a vehicle according to an embodiment of the present disclosure.

Hereinafter, some embodiments of the present disclosure are described in detail with reference to the drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions has been omitted in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component and the terms do not limit the nature, sequence, or order of the constituent components. Unless otherwise defined, all terms used herein, including technical or scientific terms, have the same meanings as those generally understood by those having ordinary skill in the art to which the present disclosure pertains. Such terms as those defined in a generally used dictionary are to be interpreted as having meanings consistent with the contextual meanings in the relevant field of art and are not to be interpreted as having ideal or excessively formal meanings unless clearly defined as having such in the present application. When a component, device, element, or the like of the present disclosure is described as having a purpose or performing an operation, function, or the like, the component, device, or element should be considered herein as being "configured to" meet that purpose or to perform that operation or function.

FIG. 1 is a block diagram illustrating a configuration of a screen control apparatus of a vehicle according to an embodiment of the present disclosure.

Referring to FIG. 1, a screen control apparatus 100 of a vehicle may include a controller 110, an interface 120, a communication device 130, a storage 140, a sensing device 150, a brightness determining device 160, and a weight setting device 170. Herein, the controller 110, the sensing device 150, the brightness determining device 160, and the weight setting device 170 of the screen control apparatus 100 may be implemented as at least one processor.

The controller 110 may control the respective components of the screen control apparatus 100 and may process a signal delivered between the respective components.

The interface 120 may include an input means for receiving a control command from a user and an output means for outputting an operation state, an operation result, or the like of the screen control apparatus 100.

Herein, the input means may include a key button and may include a soft key implemented on a display. Furthermore, the input means may include a mouse, a joystick, a jog shuttle, a stylus pen, or the like.

An output means may include a display and may include a voice output means such as a speaker. As an example, the display may correspond to a display of an audio video navigation (AVN) system in the vehicle.

In this case, when a touch sensor such as a touch film, a touch sheet, or a touch pad is provided in the display, the display may operate as a touchscreen and may be implemented in a form where the input means and the output means are integrated with each other.

In this case, the display may include at least one of a liquid crystal display (LCD), a thin film transistor-LCD (TFT-LCD), an organic light-emitting diode (OLED) display, a flexible display, a field emission display (FED), or a three-dimensional (3D) display.

The communication device 130 may include a communication module for vehicle network communication with electronics and/or controllers provided in the vehicle.

Herein, a technology for the vehicle network communication may include controller area network (CAN) communication, local interconnect network (LIN) communication, flex-ray communication, or the like.

Furthermore, the communication device 130 may include a communication module for accessing wireless Internet or a communication module for short range communication.

Herein, a technology for the wireless Internet may include wireless local area network (WLAN), wireless broadband (WiBro), wireless-fidelity (Wi-Fi), world interoperability for microwave access (WiMAX), or the like.

Furthermore, a technology for the short range communication may include Bluetooth, ZigBee, ultra-wideband (UWB), radio frequency identification (RFID), infrared data association (IrDA), or the like.

The storage 140 may store data, an algorithm, and/or the like necessary for an operation of the screen control apparatus 100.

As an example, the storage 140 may store one or more illumination measurement data measured by an illumination sensor. Furthermore, the storage 140 may store a command and/or an algorithm for determining reference illumination based on illumination information, a vehicle speed, and vehicle location information and controlling a screen brightness of the display based on the determined illumination.

Herein, the storage 140 may include a storage medium such as a random access memory (RAM), a static RAM (SRAM), a read-only memory (ROM), a programmable ROM (PROM), or an electrically erasable PROM (EEPROM).

The sensing device 150 may include an illumination sensor, which measures illumination.

The illumination sensor may measure illumination outside the vehicle in real time or at a certain period and may detect a change in illumination. At this time, the illumination measurement data measured by the illumination sensor may be stored in the storage 140.

Herein, the illumination measurement data may be accumulated and stored in the storage 140 from a time when the vehicle is turned on. The accumulated illumination measurement data may be deleted when the vehicle is turned off.

Furthermore, the illumination measurement data may be stored in an order of most recently stored data. At this time, the illumination measurement data may be stored in an order of most recently stored data by only a predetermined maximum number and the previously stored data may be deleted.

The controller 110 may deliver the illumination measurement data to the brightness determining device 160 and/or the weight setting device 170.

Furthermore, the sensing device 150 may further include a vehicle speed sensor, which measures a vehicle speed. The sensing device 150 may further include a position sensor, which measures a vehicle position.

Vehicle speed data measured by the vehicle speed sensor and position data measured by the position sensor may be stored in the storage 140. As an example, the position sensor may detect whether the current position of the vehicle is a general road, a highway, a tunnel, the center of town, or a forest.

Furthermore, the controller 110 may deliver the vehicle speed data and the position data to the brightness determining device 160 and/or the weight setting device 170.

The brightness determining device 160 may determine a brightness degree based on the illumination measurement data measured by the illumination sensor.

Herein, the brightness determining device 160 may determine a brightness degree corresponding to an illumination value of the illumination measurement data based on a brightness table.

Figure 2A:
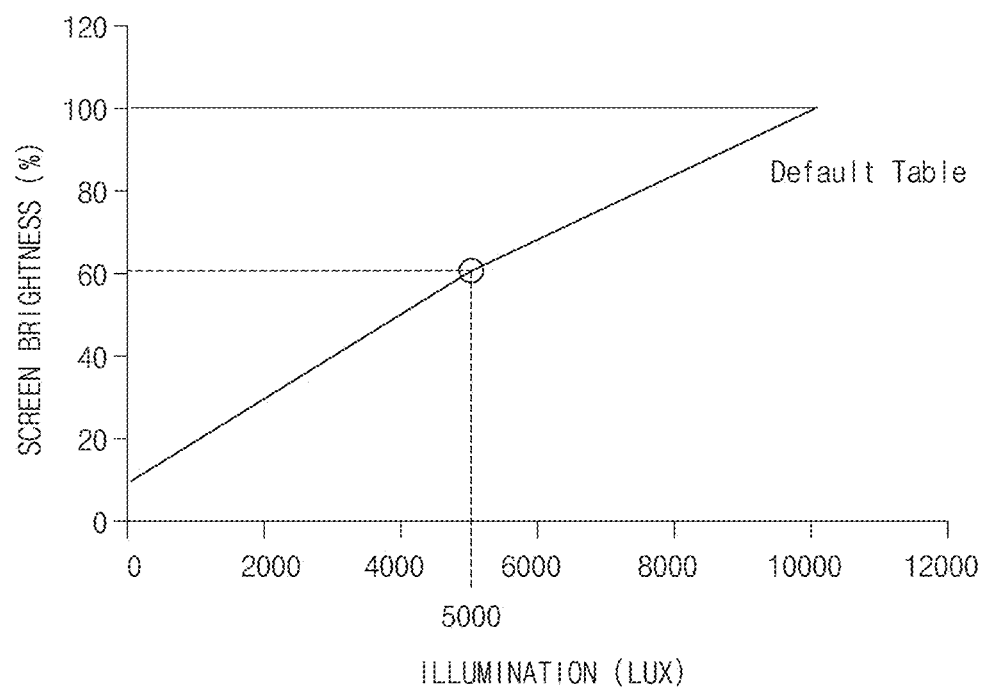
FIGS. 2A and 2B are drawings illustrating an embodiment of an operation of determining brightness based on illumination according to an embodiment of the present disclosure.

The brightness table may be a table defining a change in brightness according to a change in illumination, which may be previously defined and stored in the storage 140. Thus, an embodiment of the brightness table is described with reference to FIG. 2A. FIG. 2A is a drawing illustrating an embodiment of an operation of determining brightness based on illumination according to an embodiment of the present disclosure.

Referring to FIG. 2A, the brightness table may define a change in brightness according to a change in illumination, which may be represented as a default graph. Thus, a brightness determining device 160 of FIG. 1 may identify an illumination value from illumination measurement data and may identify a brightness degree (%) corresponding to the illumination value (Lux) previously identified in the brightness table of FIG. 2A.

As an example, when assuming that the illumination value of the illumination measurement data is 5000 Lux, the brightness degree corresponding to the illumination of 5000 Lux is 60% in the brightness table of FIG. 2A.

Thus, the brightness determining device 160 may determine the brightness degree as 60% based on the brightness table.

When the brightness degree is determined by the brightness determining device 160, a controller 110 of FIG. 1 may control a screen brightness of a display on the basis of the determined brightness degree.

Meanwhile, when a user randomly adjusts a screen brightness of the display, the brightness table may be adjusted by applying a user adjustment gain.

Herein, the user adjustment gain may be defined as a value obtained by dividing a current screen brightness degree set by the user by a brightness degree corresponding to current illumination in a current brightness table.

As an example, as shown in the embodiment of FIG. 2A, when the current illumination is 5000 Lux, the brightness degree corresponding to the current illumination is 60%.

In this case, when assuming that the brightness degree set by the user is 90%, the user adjustment gain=90%/60%=1.5.

Thus, the brightness table may be adjusted from the default graph to a graph having a value obtained by multiplying the brightness degree corresponding to the illumination by the user adjustment gain of 1.5.

Figure 3A:
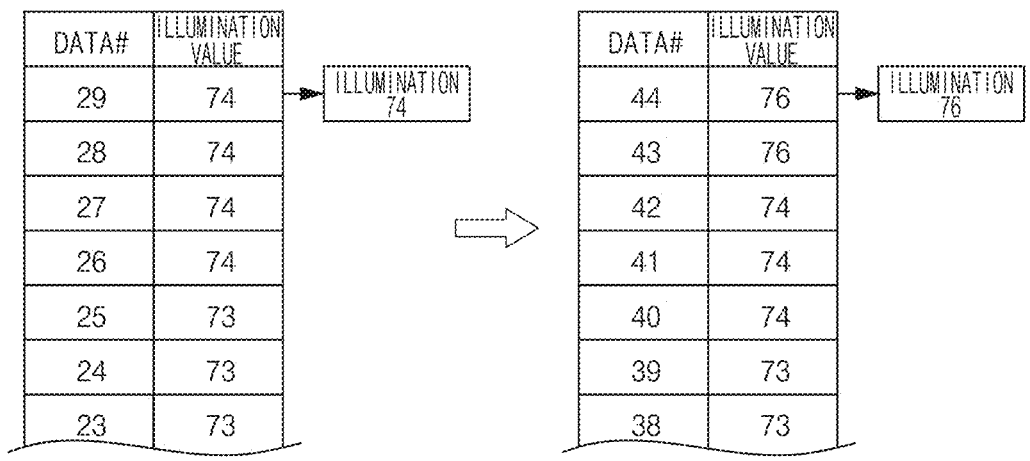
FIGS. 3A and 3B are drawings illustrating an embodiment of an operation of determining illumination according to an embodiment of the present disclosure.
Figure 3B:
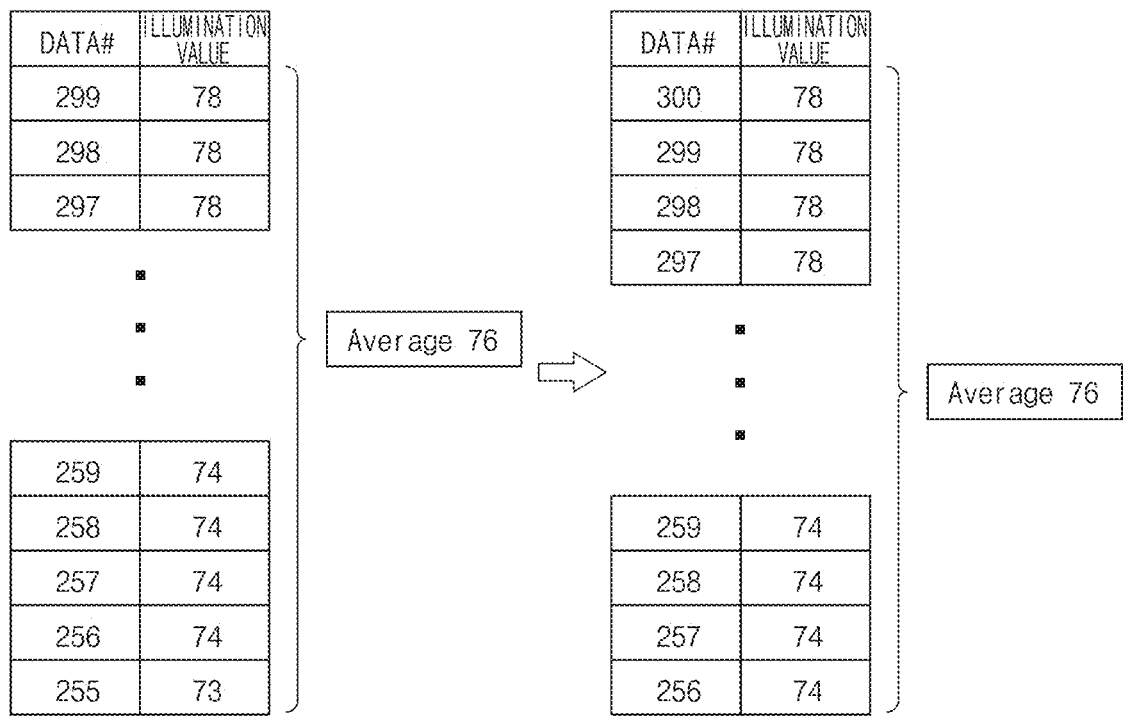

Thus, the brightness table adjusted by applying the user adjustment gain may be represented as shown in FIG. 3B.

The brightness determining device 160 may identify an illumination value from illumination measurement data and may determine a brightness degree (%) corresponding to the illumination value (Lux) identified previously in the adjusted brightness table. When the brightness degree is determined by the brightness determining device 160, the controller 110 may control a screen brightness of the display on the basis of the determined brightness degree.

In determining the brightness degree, the brightness determining device 160 may differently apply a criterion of determining the brightness degree depending on the number of illumination measurement data stored in the storage 140.

First of all, when the number of the previously stored illumination measurement data is less than a default (e.g. a default value) N, the brightness determining device 160 may determine a brightness degree on the basis of the illumination measurement data, which is most recently measured.

At this time, the brightness determining device 160 may determine the brightness degree based on the illumination measurement data, which is most recently measured. The controller 110 may control a screen brightness of the display depending on the determined brightness degree.

Thus, an embodiment of the operation of determining the brightness degree based on the illumination measurement data, which is most recently measured, is described with reference to FIG. 3A. FIG. 3A is a drawing illustrating an embodiment of an operation of determining illumination according to an embodiment of the present disclosure.

Referring to FIG. 3A, in a state where 29 illumination measurement data are stored in a storage 140 of FIG. 1, the illumination measurement data, which is most recently stored, is 29th illumination measurement data.

In this case, when assuming that a default N=45, because the number of illumination measurement data stored in the storage 140 is less than 45, a brightness determining device 160 of FIG. 1 may determine a brightness degree on the basis of the 29th illumination measurement data, which is most recently stored. As an example, the brightness degree corresponding to an illumination of the 29th illumination measurement data is 74%.

Thus, a controller 110 of FIG. 1 may control a screen brightness of a display to 74%.

Thereafter, in a state where 44 illumination measurement data are stored in the storage 140, the illumination measurement data, which is most recently stored, is 44th illumination measurement data.

At this time, when assuming that the default N=45, because the number of illumination measurement data stored in the storage 140 is less than 45, the brightness determining device 160 may determine a brightness degree on the basis of the 44th illumination measurement data, which is most recently stored. As an example, the brightness degree corresponding to an illumination of the 44th illumination measurement data is 76%.

Thus, the controller 110 may control a screen brightness of the display to 76%.

Meanwhile, when the stored illumination measurement data is greater than or equal to the default N, the brightness determining device 160 may calculate an average brightness on the N illumination measurement data in an order of being recently stored and may determine a brightness degree based on the calculated average brightness.

Thus, an embodiment of the operation of calculating the average brightness for the N illumination measurement data and determining the brightness degree is described with reference to FIG. 3B. FIG. 3B is a drawing illustrating an embodiment of an operation of determining illumination according to an embodiment of the present disclosure.

Referring to FIG. 3B, illumination measurement data stored in a storage 140 of FIG. 1 is 299. In this case, when assuming that a default N=45, because the number of illumination measurement data stored in the storage 140 is greater than or equal to 45, a brightness determining device 160 of FIG. 1 may calculate an average brightness on the basis of the N illumination measurement data in an order of being most recently stored.

Herein, the brightness determining device 160 may calculate 45 brightness degrees corresponding to 45 illumination measurement data in an order of being recently stored and may calculate an average brightness of the 45 brightness degrees.

Because the most recently determined brightness degree is No. 299 illumination measurement data, the brightness determining device 160 may calculate an average brightness on the basis of 45 illumination measurement data from the No. 299 illumination measurement data, i.e., 255th to 299th illumination measurement data.

As an example, because the average brightness calculated on the basis of the 255th to 299th illumination measurement data is 76%, the brightness determining device 160 may determine the brightness degree as 76%.

Thus, the controller 110 may control a screen brightness of the display to 76%.

Thereafter, when 300th illumination measurement data measured by an illumination sensor is stored in the storage 140, the brightness determining device 160 may calculate an average brightness of the 45 illumination measurement data again on the basis of recently stored illumination measurement data.

Herein, because the most recently determined brightness degree is No. 300 illumination measurement data, the brightness determining device 160 may calculate an average brightness on the basis of 45 illumination measurement data from the No. 300 illumination measurement data, i.e., 256th to 300th illumination measurement data.

As an example, because the average brightness calculated on the basis of the 256th to 300th illumination measurement data is 76%, the brightness determining device 160 may determine the brightness degree as 76%.

Thus, the controller 110 may control a screen brightness of the display to 76%.

Meanwhile, the illumination measurement data is sensitive to a change in surrounding environment.

For example, because there are many structures, buildings, trees, and/or the like, which interferes with illumination measurement in a tunnel, the center of town, or a forest, a measurement value of the illumination measurement data may fail to be accurate.

Meanwhile, because there are less elements, which interfere with illumination measurement in a highway than in a general road, a surrounding environment changes consistently.

Thus, the brightness determining device 160 may differently apply the number of illumination measurement data used to determine a brightness depending on a position of the vehicle.

The number of average data applied to determine a brightness of each road type is shown in FIG. 4A. FIG. 4A is a drawing illustrating an embodiment of an operation of adjusting the number of average data according to an embodiment of the present disclosure.

Referring to FIG. 4A, the number of average data in a general road is applied to N. Herein, the number of the average data in the general road may be defined as a default.

As an example, N is 45. This may vary with a response speed of an illumination sensor. In other words, when the response speed of the sensor is 40 ms, the number of average data with the minimum sense of difference is 45.

Thus, a brightness determining device 160 of FIG. 1 may calculate an average brightness using 45 illumination measurement data in the general road.

The N average data is applied in the general road, but illumination is sharply changed when a vehicle enters a tunnel on the general road. Thus, the number of average data when the vehicle enters the tunnel on the general road is applied to (N−1) obtained by subtracting the default from a first value α. Herein, to prevent the illumination from being sharply changed, the number of average data may be applied to (N−α) before a certain distance from a tunnel entrance.

Thus, the brightness determining device 160 may determine a brightness using (N−α) illumination measurement data before the certain distance from entering a tunnel on the general road.

Herein, after exiting the tunnel, (N−α) may be adjusted again to N, which is the number of average data in the general road.

Meanwhile, the surrounding environment is changed more consistently in a highway than in the general road. As such, because the environmental change is low in the highway, the number of noise data is reduced. Thus, the number of average data in the highway is applied to (N−α) obtained by subtracting the default from the first value α.

Thus, the brightness determining device 160 may determine a brightness using (N−α) illumination measurement data when the vehicle enters the highway.

Herein, the first value α may vary with a response speed of an illumination sensor. In other words, the first value α may be defined as a value corresponding to a certain time on the basis of the response speed of the illumination sensor.

As an example, when the response speed of the illumination sensor is 40 ms, the first value α may be defined as a value of 15 corresponding to 0.6 seconds of 40 ms. Herein, it is only one embodiment and it should be apparent that, in other embodiments, it is possible to change these parameters in any degree depending on an implementation form.

When the vehicle enters a tunnel on a highway, illumination may be rapidly changed. Thus, the number of average data when the vehicle enters the tunnel on the highway is more reduced than the number (N−α) of average data in the highway.

Thus, the number of average data when the vehicle enters the tunnel on the highway is applied to (N−β) obtained by subtracting the default from a second value β. Herein, the second value β has a value larger than the first value α. Herein, to prevent the illumination from being rapidly changed, the number of average data may be applied to (N−β) before a certain distance from a tunnel entrance.

Thus, the brightness determining device 160 may determine a brightness using (N−β) illumination measurement data before the certain distance from when the vehicle enters the tunnel on the highway.

Herein, after the vehicle exits the tunnel, (N−β) may be adjusted again to (N−α), which is the number of average data in the highway.

Figure 4B:
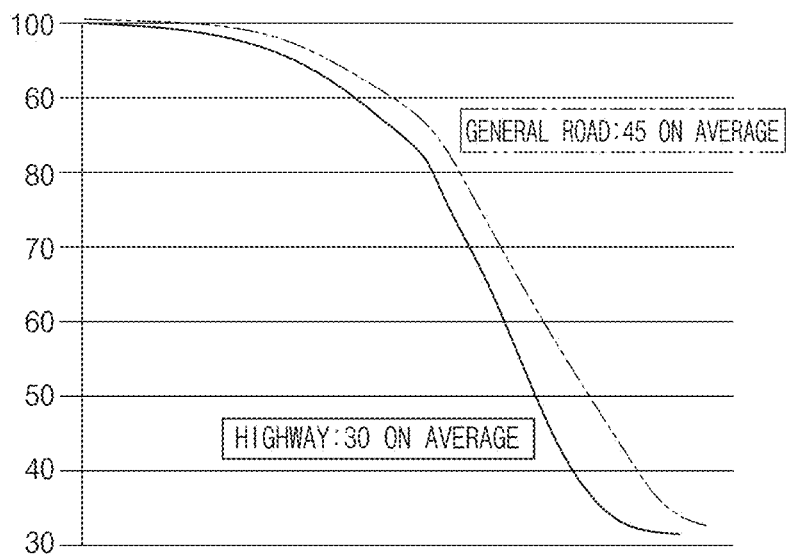

A change in average brightness according to a change in the number of average data in the general road and the highway is described with reference to a graph of FIG. 4B. FIG. 4B is a drawing illustrating an embodiment of an operation of adjusting the number of average data according to an embodiment of the present disclosure.

Referring to FIG. 4B, when the number of average data applied to calculate an average brightness increases, because it is robust to noise data, but because the number of data increases, there is an increase in a time taken to reflect current illumination data.

Meanwhile, when the number of average data applied to calculate an average brightness decreases, because it is vulnerable to noise data, but because the number of data decreases, there is a decrease in a time taken to reflect current illumination data.

Because the highway has a section, which is a tunnel, and a section, which is not a tunnel, and has a relatively smaller environmental change than the general road, although the number of average data is reduced as noise data is reduced, a reflection speed of illumination measurement data is improved.

As an example, when controlling a brightness using 45 illumination measurement data on average in the general road, illumination measurement data between 1.8 seconds (45*0.04 s=1.8 s) may be reflected in brightness control.

On the other hand, when the number of average data is corrected to 30 in the highway, illumination measurement data between 1.2 seconds (30*0.04 s=1.2 s) may be reflected in brightness control.

As such, when the number of average data is adjusted according to the road environment, a reflection speed of illumination measurement data may be controlled.

Meanwhile, because an urban environment has many high buildings, a change width of an illumination environment due to it is large. Thus, many noise data may occur among the illumination measurement data.

Thus, the number of average data increases in the urban environment. Herein, the number of average data in the urban environment may be applied to (N+α) obtained by adding the default to the first value α.

Thus, a brightness determining device 160 of FIG. 1 may determine a brightness using (N+α) illumination measurement data when the vehicle enters the center of town.

When the vehicle exits the center of town, (N−α) may be adjusted again to N, which is the number of average data in the general road.

Furthermore, because a forest environment has many trees, a change width of an illumination environment due to the forest environment is large. In this case, the forest environment has a larger change width of the illumination environment than the urban environment.

Thus, the number of average data more increases in the forest environment than in the urban environment. In this case, the number of average data in the forest environment may be applied to (N+β) obtained by adding the default to the second value β.

Thus, the brightness determining device 160 may determine a brightness using (N+β) illumination measurement data when the vehicle enters the forest.

Meanwhile, in determining an average brightness of illumination measurement data, the illumination measurement data, which is a criterion of determining the average brightness, may vary with a vehicle speed and/or a vehicle position.

When the average brightness is calculated on the basis of N illumination measurement data, a different weight may be set to each illumination measurement data according to a vehicle speed.

An illumination change progresses slowly when the vehicle speed is slow, but the illumination change progresses rapidly when the vehicle speed is fast.

Thus, a weight setting device 170 of FIG. 1 may set a weight to each illumination measurement data and may differently set a weight of each illumination measurement data depending on a vehicle speed.

As an example, when the vehicle speed is slow, the weight setting device 170 may set a uniform weight to N illumination measurement data.

Meanwhile, when the vehicle speed is fast, the weight setting device 170 may set a weight to the N illumination measurement data, which may set a larger weight to recent M illumination measurement data to reflect a rapid change in illumination.

First of all, the weight setting device 170 may calculate the number of weights of data for each vehicle speed and may calculate a calculated number of weights %.

Herein, when assuming that the reference distance is 10 m and the reference time of a period when data is stored is 40 ms, the weight setting device 170 obtains a required time taken to move 10 m at a current vehicle speed and obtains the number of data accumulated when moving 10 m by dividing the required time by 40 ms.

For example, when the current vehicle speed is 80 km/h, a required time taken to move 10 m is 0.45 s. At this time, by dividing the required time of 0.45 s by 40 ms, 0.45 [s]/40 [ms]=0.45 [s]/0.04 [s]=11.25. Thus, when the current vehicle speed is 80 km/h, the number of weights of data is about 11.

When the calculated number of weights of data is greater than the default N, the weight setting device 170 uniformly sets a weight to N data.

The weight % refers to a ratio obtained by subtracting the number of weights of data from the number N of all data.

As an example, when the number of weights of data is 11, the weight %=[1−(11/45)]×100=about 75%.

Thus, the weight setting device 170 calculates a weight of each illumination measurement data using the calculated number of weights of data and the calculated weight %.

In this case, the weight setting device 170 calculates a weight of recent illumination measurement data corresponding to the number M of weights with reference to Equation 1 below.

$$\text{Weight of recent } M \text{ illumination measurement data} = \text{weight \%/the number of weights} \quad \text{[Equation 1]}$$

For example, when a weight of 75% is applied to recent 11 illumination measurement data, a weight of each of the 11 illumination measurement data is 75[%]/11=0.75/11=about 0.068.

Figure 2B:
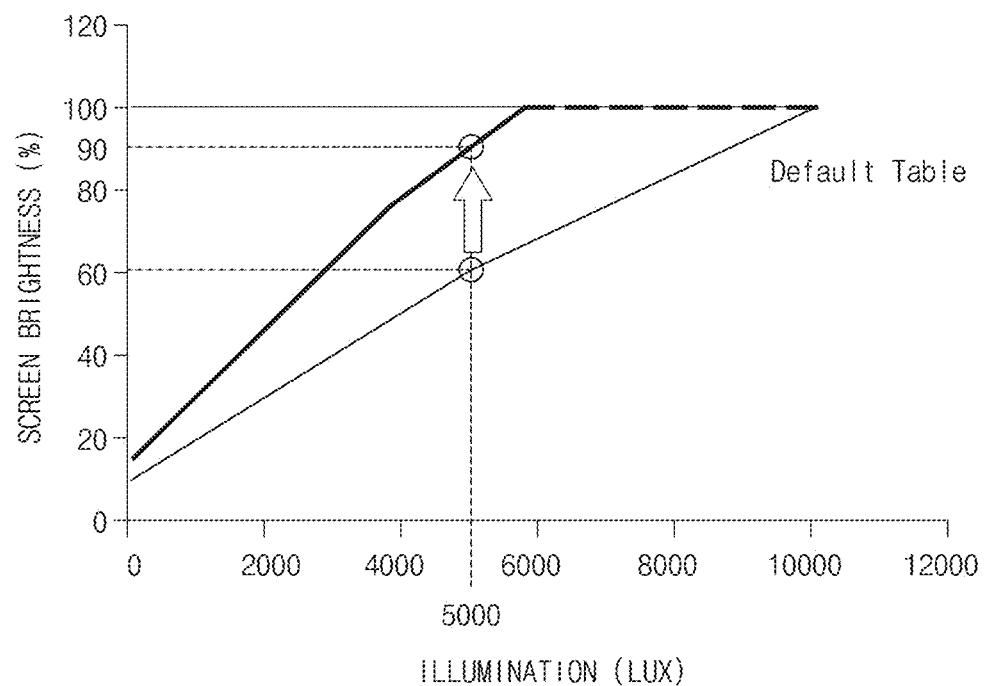

Meanwhile, the weight setting device 170 calculates a weight of previous illumination measurement data except for recent M illumination measurement data among N illumination measurement data with reference to FIG. 2 below.

Weight of previous illumination measurement data=
(1−weight %)/(N−M)   [Equation 2]

In Equation 2 above, N refers to the number of reference data applied to calculate an average brightness and M refers to the number of weights of data.

For example, when a weight of 25% is applied to the other 34 illumination measurement data except for recent 11 illumination measurement data among 45 illumination measurement data, a weight of each of the 34 illumination measurement data is (1−75[%])/(45−11)=0.25/34=about 0.007.

Thus, the weight setting device 170 may set a weight of 0.068 to each of recent 11 illumination measurement data, i.e., 35th to 45th illumination measurement data and may set a weight of 0.007 to each of previous 34 illumination measurement data, i.e., 1st to 34th illumination measurement data.

At this time, the brightness determining device 160 may apply the weight set by the weight setting device 170 to calculate an average brightness for the N illumination measurement data and may determine a brightness degree based on the average brightness.

An embodiment of the operation of setting the weight depending on the vehicle speed is described with reference to FIGS. 5A, 5B, and 5C. FIGS. 5A, 5B, and 5C are drawings illustrating an embodiment of an operation of setting a weight of illumination measurement data according to an embodiment of the present disclosure.

First of all, FIG. 5A illustrates an embodiment of an operation of setting a weight when a vehicle drives at a speed of 15 km/h.

Referring to FIG. 5A, when the vehicle drives at a speed of 15 km/h, a change in illumination progresses very slowly. In this case, when assuming that N=45 and when the vehicle speed is 15 km/h, because a required time taken to move 10 m is 2.4 s, the number of weights of data is 2.4 [s]/40 [ms]=2.4 [s]/0.04 [s]=60. Thus, because the number of weights of data is greater than the default 45, a weight setting device 170 of FIG. 1 uniformly sets a weight of 1/45 to 45 illumination measurement data.

Thus, a brightness determining device 160 of FIG. 1 may calculate an average brightness on the basis of the recent 45 illumination measurement data and may determine a final brightness degree.

FIG. 5B illustrates an embodiment of an operation of setting a weight when the vehicle drives at a speed of 50 km/h.

Referring to FIG. 5B, when the vehicle drives at a speed of 50 km/h, the speed is not very fast, but a change in illumination may progress faster than that in FIG. 5A. In this case, when assuming that N=45, when the current vehicle speed is 50 km/h, a required time to taken to move 10 m is 0.72 s. At this time, by dividing the required time of 0.72 s by 40 ms, 0.72 [s]/40 [ms]=0.72 [s]/0.04 [s]=18. Thus, when the current vehicle speed is 50 km/h, the number of weights of data is about 18.

Furthermore, when the number of weights of data is 18, the weight %=[1−(18/45)]×100=60%.

Thus, when a weight of 60% is applied to recent 18 illumination measurement data, a weight of each of the 18 illumination measurement data is 60[%]/18=0.6/18=1/30 (≈0.03).

Meanwhile, when a weight of 40% is applied to the other illumination measurement data except for recent 18 illumination measurement data among 45 illumination measurement data, a weight of each of the 27 illumination measurement data is 40[%]/27=0.4/27=2/135 (≈0.014).

Thus, the weight setting device 170 may set a weight of 1/30 to each of recent 18 illumination measurement data, i.e., 28th to 45th illumination measurement data and may set a weight of 2/135 to each of previous 27 illumination measurement data, i.e., 1st to 27th illumination measurement data.

Thus, the brightness determining device 160 may calculate an average brightness on the basis of the illumination measurement data to which the weight is assigned and may determine a final brightness degree.

FIG. 5C illustrates an embodiment of an operation of setting a weight when the vehicle drives at a speed of 100 km/h.

Referring to FIG. 5C, when the vehicle drives at a speed of 100 km/h, because the speed is very fast, a change in illumination may progress very fast. As such, when the vehicle speed is very fast, because recent illumination measurement data is more important, a weight of recent illumination measurement data is set to be higher.

When assuming that N=45, when the current vehicle speed is 100 km/h, a required time to taken to move 10 m is 0.36 s. At this time, by dividing the required time of 0.36 s by 40 ms, 0.36 [s]/40 [ms]=0.36 [s]/0.04 [s]=9. Thus, when the current vehicle speed is 100 km/h, the number of weights of data is 9.

Furthermore, when the number of weights of data is 9, the weight %=[1−(9/45)]×100=80%.

Thus, when a weight of 80% is applied to recent 9 illumination measurement data, a weight of each of the 9 illumination measurement data is 80[%]/9=0.8/9=4/45 (≈0.08).

Meanwhile, when a weight of 20% is applied to the other illumination measurement data except for recent 9 illumination measurement data among 45 illumination measurement data, a weight of each of the 36 illumination measurement data is 20[%]/36=0.2/36=1/180 (≈0.005).

Thus, the weight setting device 170 may set a weight of 4/45 to each of recent 9 illumination measurement data, i.e., 37th to 45th illumination measurement data and may set a weight of 1/180 to each of previous 36 illumination measurement data, i.e., 1st to 36th illumination measurement data.

Thus, the brightness determining device 160 may calculate an average brightness on the basis of the illumination measurement data to which the weight is assigned and may determine a final brightness degree.

FIGS. 6A and 6B are drawings illustrating an embodiment of an operation of setting a weight of illumination measurement data according to another embodiment of the present disclosure.

In the embodiments of FIGS. 5A, 5B, and 5C, the weight is set on the basis of the vehicle speed. In embodiments of FIGS. 6A and 6B, a weight is set on the basis of a vehicle position and a vehicle speed.

First of all, FIG. 6A illustrates an embodiment of an operation of setting a weight when the vehicle drives at a speed of 40 km/h in the center of town.

Referring to FIG. 6A, when the current position of the vehicle is a general road in the center of town and the vehicle is traveling at a speed of 40 km/h, the number of average data is applied to a default, for example, 45 in the general road environment. However, a value obtained by adding a first value, for example, 15 to the default, i.e., 60 are defined as the number of average data in the urban environment.

In this case, when the vehicle drives at a speed of 40 km/h in the center of town, a required time taken for the vehicle to move 10 m is 0.9 s. At this time, by dividing the required time of 0.9 s by 40 ms, 0.9 [s]/40 [ms]=0.9 [s]/0.04 [s]=22.5. Thus, when the current vehicle speed is 40 km/h, the number of weights of data is about 23.

Furthermore, when the number of weights of data is 23, the weight %=[1−(23/60)]×100=about 62%.

Thus, when a weight of 62% is applied to recent 23 illumination measurement data among 60 illumination measurement data, a weight of each of 22 illumination measurement data is 62[%]/23=0.62/23=about 0.027.

Meanwhile, when a weight of 38% is applied to the other illumination measurement data except for recent 23 illumination measurement data among 60 illumination measurement data, a weight of each of the 37 illumination measurement data is 38[%]/37=0.38/37=about 0.01.

Thus, a weight setting device 170 of FIG. 1 may set a weight of 0.027 to each of recent 23 illumination measurement data, i.e., 38th to 60th illumination measurement data among the 60 illumination measurement data and may set a weight of 0.01 to each of previous 37 illumination measurement data, i.e., 1st to 37th illumination measurement data.

Thus, a brightness determining device 160 of FIG. 1 may calculate an average brightness in the urban environment on the basis of the illumination measurement data to which the weight is assigned and may determine a final brightness degree.

FIG. 6B illustrates an embodiment of an operation of setting a weight when the vehicle drives at a speed of 77 m/h in the forest.

Referring to FIG. 6B, when the current position of the vehicle is a general road in the forest and the vehicle is traveling at a speed of 77 m/h, the number of average data is applied to a default, for example, 45 in the general road environment. However, a value obtained by adding a second value, for example, 30 to the default, i.e., 75 are defined as the number of average data in the forest environment.

In this case, when the vehicle drives at a speed of 77 km/h in the forest, a required time taken for the vehicle to move 10 m is about 0.47 s. At this time, by dividing the required time of 0.47 s by 40 ms, 0.47 [s]/40 [ms]=0.9 [s]/0.04 [s]=11.75. Thus, when the current vehicle speed is 40 km/h, the number of weights of data is about 12.

Furthermore, when the number of weights of data is 12, the weight %=1−(12/75)]×100=about 84%.

Thus, when a weight of 84% is applied to recent 12 illumination measurement data among 75 illumination measurement data, a weight of each of 12 illumination measurement data is 84[%]/12=0.84/12=0.07.

Meanwhile, when a weight of 16% is applied to the other illumination measurement data except for recent 12 illumination measurement data among the 75 illumination measurement data, a weight of each of the 63 illumination measurement data is 16[%]/63=0.16/63=about 0.003. The decimal places have been rounded up in the above calculation. However, this may be calculated by discarding decimal places depending on an implementation form.

Thus, the weight setting device 170 may set a weight of 0.07 to each of recent 12 illumination measurement data, i.e., 64th to 75th illumination measurement data among the 75 illumination measurement data and may set a weight of 0.003 to each of previous 63 illumination measurement data, i.e., 1st to 63rd illumination measurement data.

Thus, the brightness determining device 160 may calculate an average brightness in the forest environment on the basis of the illumination measurement data to which the weight is assigned and may determine a final brightness degree.

As described above, the screen control apparatus 100 of the vehicle according to an embodiment of the present disclosure may calculate an average brightness on the basis of illumination measurement data, when the number of illumination measurement data is greater than or equal to the default. The screen control apparatus 100 may control a screen of the display. Thus, a brightness suitable for the screen of the display may be provided.

In addition, the screen control apparatus 100 of the vehicle according to an embodiment of the present disclosure may apply the number of average data and/or a weight depending on a vehicle position and/or a vehicle speed to improve visibility of the screen.

The screen control apparatus 100 according to an embodiment of the present disclosure, which performs the above-mentioned operations, may be implemented in the form of an independent hardware device including a memory and a processor for processing each operation or may be driven in the form of being included in another hardware device such as a microprocessor or a universal computer system.

A description is given in detail of the operational flow of the screen control apparatus 100 according to an embodiment of the present disclosure. The screen control apparatus 100 has the above-mentioned configuration.

Figure 7:
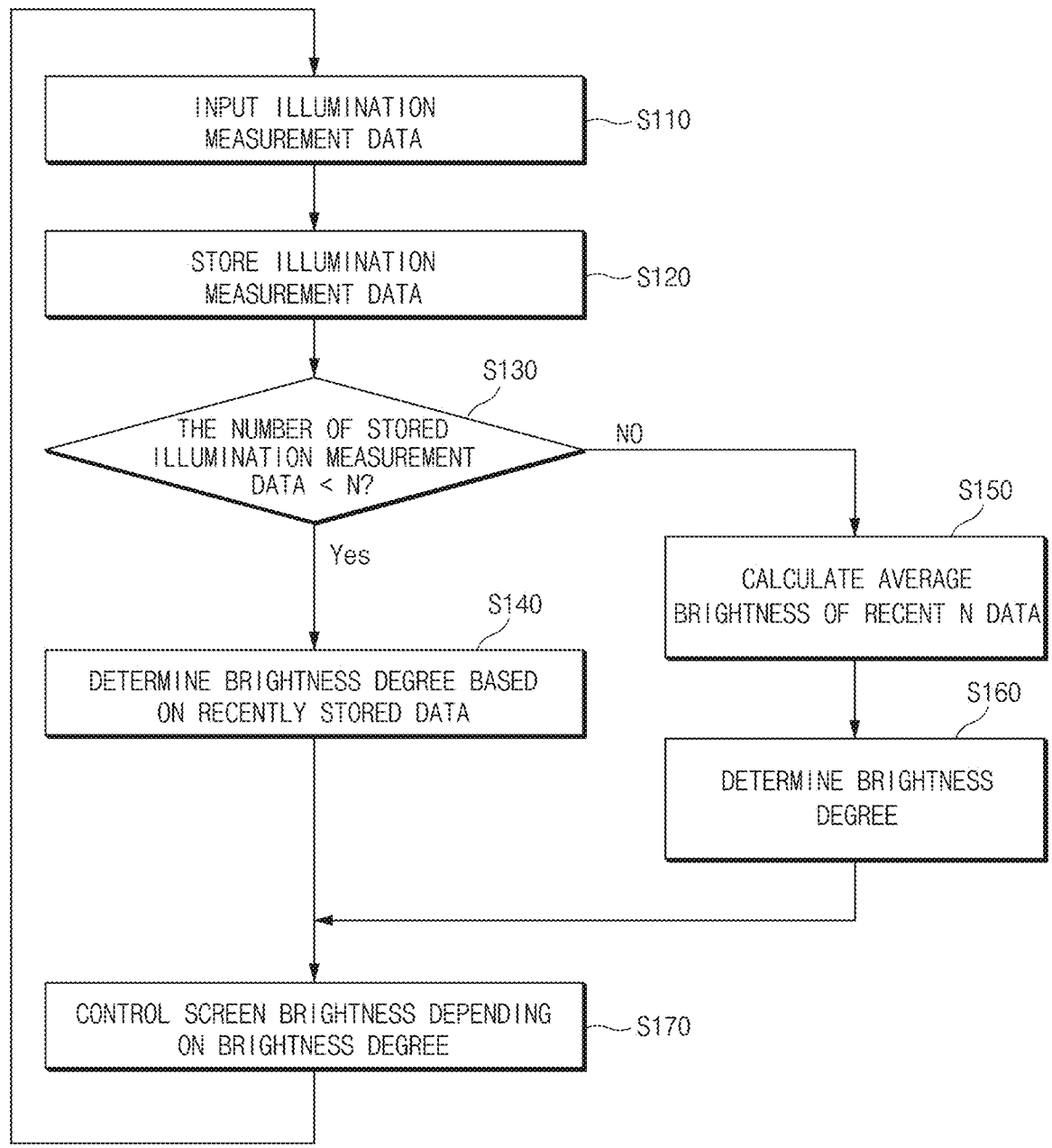
FIGS. 7, 8, and 9 are drawings illustrating operational flow of a screen control method of a vehicle according to an embodiment of the present disclosure.

FIG. 7 is a drawing illustrating operational flow for a screen control method of a vehicle according to an embodiment of the present disclosure.

Referring to FIG. 7, when illumination measurement data is input from an illumination sensor in S110, in S120, a screen control apparatus 100 may store the input illumination measurement data.

The screen control apparatus 100 may identify the number of previously stored illumination measurement data. When the number of illumination measurement data is less than a default N in S130, in S140, the screen control apparatus 100 may determine a brightness degree based on recently stored illumination measurement data.

In S140, the screen control apparatus 100 may determine a brightness degree corresponding to illumination of the illumination measurement data, based on a brightness table previously defining a brightness change according to an illumination change.

Thus, when the brightness degree is determined in S140, in S170, the screen control apparatus 100 may control a screen brightness of a display depending on the determined brightness degree.

Meanwhile, when the number of illumination measurement data is greater than or equal to the default N in S130, in S150, the screen control apparatus 100 may calculate an average brightness for recent N illumination measurement data. In S160, the screen control apparatus 100 may determine a brightness degree based on the average brightness calculated in S150.

Thus, in S170, the screen control apparatus 100 may control a screen brightness of the display depending on the determined brightness degree using the N illumination measurement data in S160.

Figure 8:
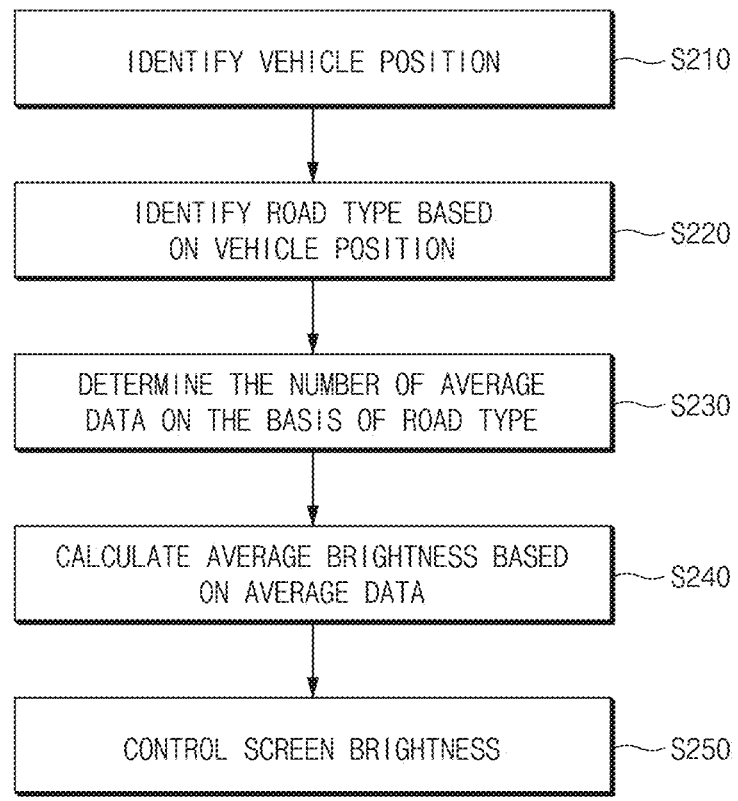

FIG. 8 illustrates an operation of adjusting the number of average data according to an embodiment of the present disclosure.

Referring to FIG. 8, in S210, a screen control apparatus 100 may identify a vehicle position from a position sensor. As an example, the position sensor may be a global positioning system (GPS) module of a navigation system.

In S220, the screen control apparatus 100 may identify a road type based on the vehicle position identified in S210. Herein, the road type may be any one of a general road, a general road+a tunnel, a highway, a highway+a tunnel, the center of town, and/or a forest. Of course, this is merely one embodiment. In addition, it is natural that various road types may be included.

When the road type is identified in S220, in S230, the screen control apparatus 100 may determine the number of average data on the basis of the road type identified in S220.

In S230, the screen control apparatus 100 may determine the number of average data for each road type with reference to the table of FIG. 4A.

In S240, the screen control apparatus 100 may calculate an average brightness based on illumination measurement data corresponding to the number of average brightness. In S250, the screen control apparatus 100 may determine a brightness degree depending on the calculated average brightness to control a screen brightness of the display.

Figure 9:
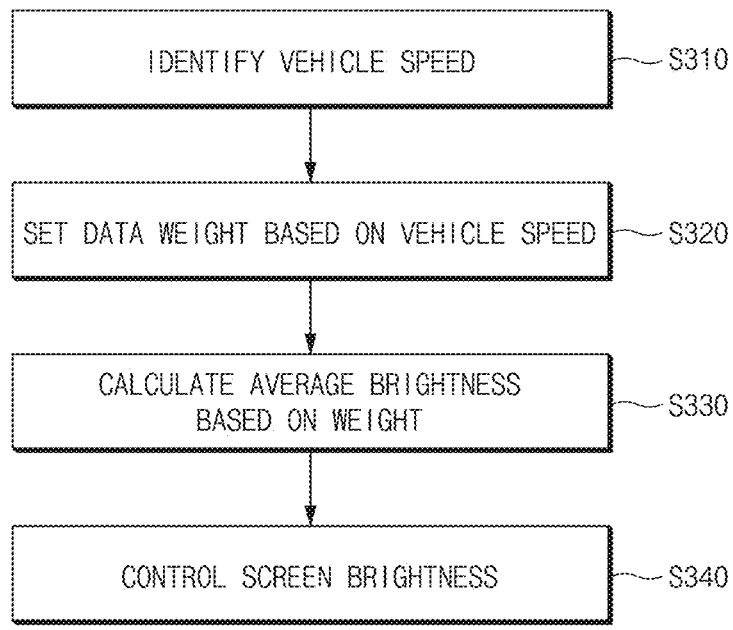

FIG. 9 illustrates an operation of setting a weight of illumination measurement data according to an embodiment of the present disclosure.

Referring to FIG. 9, in S310, a screen control apparatus 100 may identify a vehicle speed from a vehicle speed sensor.

In S320, the screen control apparatus 100 may set a weight to each of illumination measurement data based on the vehicle speed identified in S310. Herein, the screen control apparatus 100 may set a weight to each of N illumination measurement data or each of a number of illumination measurement data, which is adjusted according to a vehicle position.

The embodiment of the process of setting the weight of each illumination measurement data based on the vehicle speed refers to FIGS. 5A, 5B, 5C.

When the weight of each illumination measurement data is set in S320, in S330, the screen control apparatus 100 may calculate an average brightness for the illumination measurement data based on the weight set to each illumination measurement data. In S340, the screen control apparatus 100 may determine a brightness degree depending on the calculated average brightness to control a screen brightness of the display.

Figure 10:
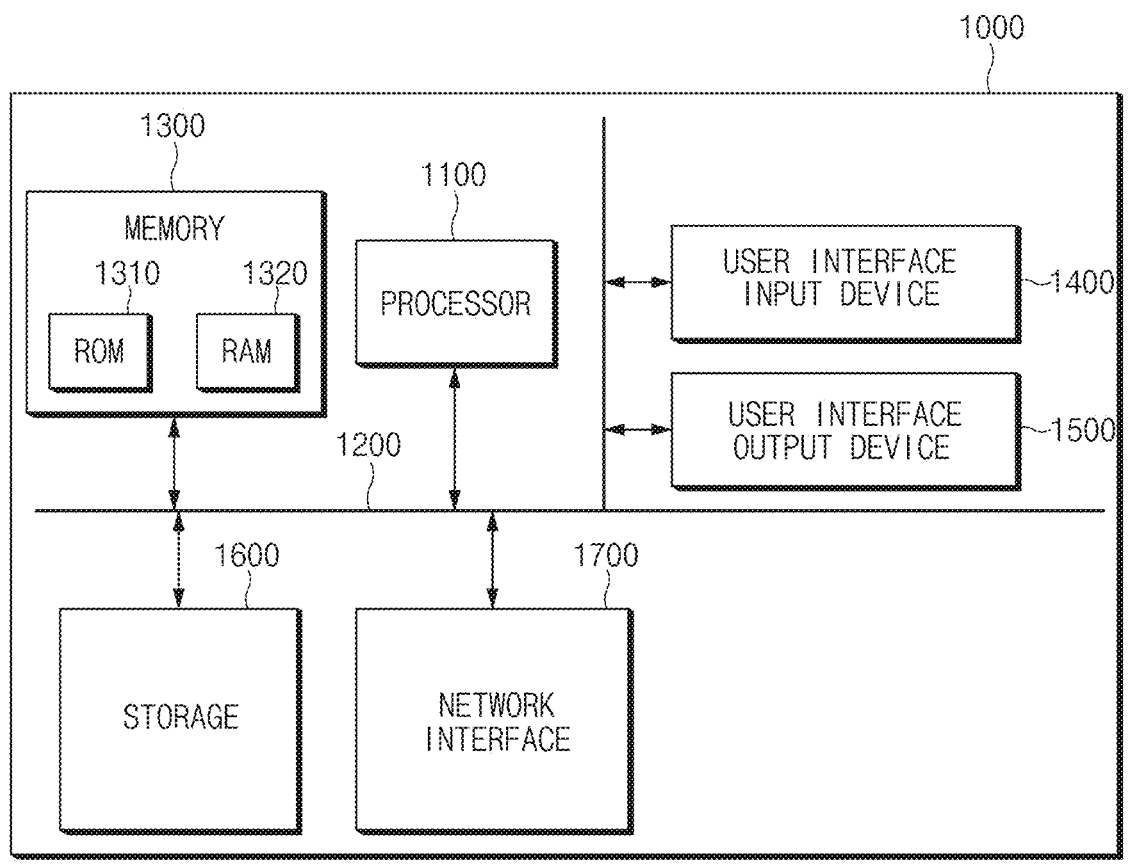
FIG. 10 is a block diagram illustrating a computing system for executing the method according to an embodiment of the present disclosure.

FIG. 10 is a block diagram illustrating a computing system for executing the method according to an embodiment of the present disclosure.

Referring to FIG. 10, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described in connection with the embodiments disclosed herein may be embodied directly in hardware or a software module executed by the processor 1100, or in a combination thereof. The software module may reside on a storage medium (i.e., the memory 1300 and/or the storage 1600) such as a RAM, a flash memory, a ROM, an EPROM, an EEPROM, a register, a hard disk, a removable disk, and a CD-ROM. The storage medium may be coupled to the processor and the processor may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

According to an embodiment of the present disclosure, the screen control apparatus 100 may provide an optimized screen brightness of the display by using the illumination sensor and the vehicle speed and position information in a vehicle environment having a rapid change in illumination. Thus, visibility of the user may be improved.

Furthermore, according to an embodiment of the present disclosure, the screen control apparatus 100 may apply a screen adjustment gain according to a user setting to a brightness table determining a brightness degree. Thus, satisfaction of the user may be improved.

Hereinabove, although the present disclosure has been described with reference to embodiments and the accompanying drawings, the present disclosure is not limited thereto. The embodiments and the present disclosure may be variously modified and altered by those having ordinary skill in the art to which the present disclosure pertains without departing from the spirit and scope of the present disclosure claimed in the following claims.

Therefore, the embodiments of the present disclosure are provided to explain the spirit and scope of the present disclosure and not to limit them. Thus, the spirit and scope of the present disclosure is not limited by the embodiments. The scope of the present disclosure should be construed on the basis of the accompanying claims and all the technical ideas within the scope equivalent to the claims should be included in the scope of the present disclosure.

What is claimed is:

1. A screen control apparatus of a vehicle, the screen control apparatus comprising:
 a memory configured to store program instructions; and
 a processor configured to execute the program instructions, wherein the program instructions, when executed, are configured to
 measure illumination,
 determine a brightness degree corresponding to the illumination from one or more illumination measurement data,
 control a screen brightness of a display depending on the determined brightness degree,
 calculate an average brightness on the basis of illumination measurement data corresponding to the number of average data, when the number of the illumination measurement data is greater than or equal to a default,
 determine the brightness degree based on the average brightness,
 variably set the number of the average data depending on a position of the vehicle, set the number of the average data to a value less than the default, when the position of the vehicle is a highway or when the vehicle enters a forward tunnel, and control the screen brightness of the display, whenever the brightness degree is changed.

2. The screen control apparatus of claim 1, wherein the program instructions, when executed, are further configured to determine the brightness degree using most recently received illumination measurement data, when the number of the illumination measurement data is less than a default.

3. The screen control apparatus of claim 1, wherein the program instructions, when executed, are further configured to extract the illumination measurement data corresponding to the number of the average data in an order of being recently stored among previously stored illumination measurement data.

4. The screen control apparatus of claim 1, wherein the program instructions, when executed, are further configured to set the number of the average data to the default, when the position of the vehicle is a general road.

5. The screen control apparatus of claim 1, wherein the program instructions, when executed, are further configured to set the number of the average data to a value greater than the default, when the position of the vehicle is the center of town or a forest.

6. The screen control apparatus of claim 1, wherein the program instructions, when executed, are further configured to set a weight to the illumination measurement data corresponding to the number of the average data depending on a vehicle speed.

7. The screen control apparatus of claim 6, wherein the program instructions, when executed, are further configured to calculate the applied number of weights and a weight % based on a required time taken to move by a reference distance on the basis of a current vehicle speed.

8. The screen control apparatus of claim 7, wherein the program instructions, when executed, are further configured to divide the weight % by the applied number of the weights and respectively assigns the divided weights to illumination measurement data corresponding to the applied number of the weights in an order of being recently stored.

9. The screen control apparatus of claim 8, wherein the program instructions, when executed, are further configured to divide the other weight % except for the weight % and respectively assigns the divided weights to the other illumination measurement data except for the illumination measurement data to which the weights are assigned.

10. The screen control apparatus of claim 7, wherein the program instructions, when executed, are further configured to assign an equal weight to the illumination measurement data corresponding to the number of the average data, when the applied number of the weights is greater than the number of the average data.

11. The screen control apparatus of claim 1, wherein the program instructions, when executed, are further configured to determine the brightness degree corresponding to the illumination from the illumination measurement data based on a brightness table defining a brightness change according to an illumination change.

12. The screen control apparatus of claim 11, wherein the program instructions, when executed, are further configured to correct the brightness table by applying a brightness adjustment gain of a user, when the screen brightness of the display is adjusted by the user.

13. A screen control method of a vehicle, the screen control method comprising:

measuring illumination;

determining a brightness degree corresponding to the illumination from one or more illumination measurement data; and controlling a screen brightness of a display depending on the determined brightness degree, wherein determining the brightness degree includes determining the brightness degree using most recently received illumination measurement data, when the number of the illumination measurement data is less than a default, calculating an average brightness on the basis of illumination measurement data corresponding to the number of average data when the number of the illumination measurement data is greater than or equal to the default, determining the brightness degree based on the average brightness, variably setting the number of the average data depending on a position of the vehicle and setting a weight to the illumination measurement data corresponding to the number of the average data depending on a vehicle speed, and wherein the controlling of the screen brightness includes controlling the screen brightness of the display, whenever the brightness degree is changed.

14. The screen control method of claim 13, wherein the determining of the brightness degree includes:

determining the brightness degree corresponding to the illumination from the illumination measurement data based on a brightness table defining a brightness change according to an illumination change; and correcting the brightness table by applying a brightness adjustment gain of a user, when the screen brightness of the display is adjusted by the user.

15. A screen control apparatus of a vehicle, the screen control apparatus comprising:

a memory configured to store program instructions; and a processor configured to execute the program instructions, wherein the program instructions, when executed, are configured to measure illumination, determine a brightness degree corresponding to the illumination from one or more illumination measurement data, control a screen brightness of a display depending on the determined brightness degree, calculate an average brightness on the basis of illumination measurement data corresponding to the number of average data, when the number of the illumination measurement data is greater than or equal to a default, determine the brightness degree based on the average brightness, variably set the number of the average data depending on a position of the vehicle, set the number of the average data to a value greater than the default, when the position of the vehicle is the center of town or a forest, and control the screen brightness of the display, whenever the brightness degree is changed.

16. The screen control apparatus of claim 15, wherein the program instructions, when executed, are further configured to determine the brightness degree using most recently received illumination measurement data, when the number of the illumination measurement data is less than a default.

17. The screen control apparatus of claim 15, wherein the program instructions, when executed, are further configured to extract the illumination measurement data corresponding to the number of the average data in an order of being recently stored among previously stored illumination measurement data.

18. The screen control apparatus of claim 15, wherein the program instructions, when executed, are further configured to set the number of the average data to the default, when the position of the vehicle is a general road.

19. The screen control apparatus of claim 15, wherein the program instructions, when executed, are further configured to set a weight to the illumination measurement data corresponding to the number of the average data depending on a vehicle speed.

* * * * *